Figure 1:
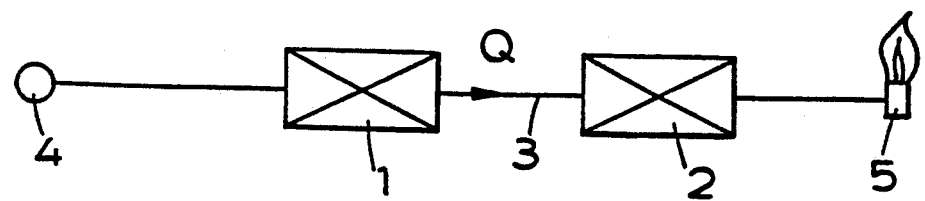

United States Patent [19]

Thomas et al.

[11] Patent Number: 5,291,780
[45] Date of Patent: Mar. 8, 1994

[54] FLOW METERS

[76] Inventors: Paul D. Thomas, 11 Briston Close, Brierly Hill, West Midland DY5 3JX, Great Britain; Cetin Mazharoglu, Eastern Mediterranean University Department Mechanical Engineering, Magosa, Cyprus

[21] Appl. No.: 768,450

[22] PCT Filed: Apr. 12, 1990

[86] PCT No.: PCT/GB90/00570
§ 371 Date: Dec. 12, 1991
§ 102(e) Date: Dec. 12, 1991

[87] PCT Pub. No.: WO90/13007
PCT Pub. Date: Nov. 1, 1990

[30] Foreign Application Priority Data

Apr. 12, 1989 [GB] United Kingdom ............... 8908749

[51] Int. Cl.$^5$ .............................................. G01F 7/00
[52] U.S. Cl. .................................................... 73/195
[58] Field of Search ....................... 73/861.83–861.84, 73/195, 196, 197

[56] References Cited

U.S. PATENT DOCUMENTS

| 3,735,637 | 5/1973 | Penet | 73/861.84 |
| 4,067,230 | 1/1978 | Ball | 73/196 X |
| 4,118,780 | 10/1978 | Hirano | 73/196 X |
| 4,565,098 | 1/1986 | Herzl | 73/197 X |
| 4,610,162 | 9/1986 | Okabayashi et al. | 73/197 |
| 5,005,426 | 4/1991 | Lew | 73/195 X |

FOREIGN PATENT DOCUMENTS 0306193  3/1989  European Pat. Off. .
2177204  6/1985  United Kingdom ............... 73/195

Primary Examiner—Herbert Goldstein
Attorney, Agent, or Firm—Bernard L. Kleinke; Jerry R. Potts

[57] ABSTRACT

A flow meter of the non-moving part type comprises first and second measuring devices (1, 2) having different point characteristics and which are connected together in a series. A by-pass line (11) and valve (12) are connected in parallel with the flow meters and a third larger flow measuring device (10) is connected in series. At a given flow rate the valve opens and the third measuring device is used to measure the higher flow rates.

5 Claims, 1 Drawing Sheet

FLOW METERS

This invention relates to flow meters of the non-moving part type (NMP) for measuring the flow of fluid in pipes.

It is a problem to provide flow meters of the non-moving part type which can cater for a range of flow rates and properties of fluids which are encountered, for example by the flow of domestic gas through pipes.

A conventional fluidic flow meter normally comprises only one element and difficulty may be experienced in selecting correctly sized meters to cater for large turn downs demanded by some measuring activities, such as domestic gas (400:1) or water (500:1). If the flow meter is small, the sensitivity is good at low flow rates but its pressure drop becomes excessive at high flow rates. However, if the flow meter is large, it is not able to measure low flow rates, but its pressure drop at higher flow rates is acceptable. Additionally, if the calibration of the fluidic-flow meters is non-linear, then the calibration is valid for only one fluid kinematic viscosity. Ideally the calibration is required to be insensitive to fluid kinematic viscosity, but at low flow rates it is normally not.

GB 1 453 587 discloses a flow meter of the kind using a fluidic oscillator which includes feedback loops.

In a flow meter incorporating a single fluidic oscillator, a single vortex shedding meter, or an edge-tone flow meter:

$$Q = K\left(\frac{f}{St}\right) \quad 1$$

Where  $K$ = constant
 $Q$ = volume flow rate
 $St$ = Strouhal No.
 $f$ = frequency Ideally, the Strouhal No. is required to be a constant so that the measured frequency relates directly to the flow rate for any given fluid kinematic viscosity.

However, if the Strouhal No. is not constant, that is to say:

$$St = func(Re) \quad 2$$

where $Re$ is the Reynolds No.

and $$Re = C\frac{Q}{\nu} \quad 3$$

Where  $C$ is a constant
 $\nu$ is the kinematic viscosity

Putting 3 into 2 and 1

$$func\left(\frac{CQ}{\nu}\right) = \frac{Kf}{Q} \quad \text{Therefore } f = \frac{Q}{K} func\left(\frac{CQ}{\nu}\right)$$

Therefore, with only one fluidic oscillator from which the frequency (f) is measured, it is not possible uniquely to evaluate the flow rate Q unless the kinematic viscosity ($\nu$) is known. In a fluid which exhibits variable kinematic viscosity above a certain tolerance range, a single fluidic oscillator is therefore not acceptable.

According to one aspect of our invention a flow meter of the non-moving part type consists solely of first and second flow measuring means having different operating point characteristics, and the flow measuring means are connected together in series.

The flow measuring means may have either different calibration characteristics or they may be of similar geometry but of different sizes.

Since the two flow measuring means have different characteristics we can form two equations from which the flow rate and the kinematic viscosity ($\nu$) can be evaluated. As the fluid in both measuring means is the same, Q and $\nu$ are the same in both measuring means. It follows, therefore that:

$$f_1 = \frac{Q}{K_1} func_1\left(\frac{C_1 Q}{\nu}\right) \text{for the first flow means} \quad 5$$

$$f_2 = \frac{Q}{K_2} func_2\left(\frac{C_2 Q}{\nu}\right) \text{for the second flow means} \quad 6$$

The two measuring means may comprise fluidic oscillators, vortex shedding meters, edge-tone meters, or a combination of any of the three different constructions.

We are also aware of GB-A-2172996 which disclosed a flow meter comprising geometrically identical first and second fluidic elements having jet nozzles of greater and smaller opening areas, respectively, and a by-pass passage communicating with the first fluidic element in parallel with the second fluidic element, the by-pass passage including valve means adapted to open when the flow rate exceeds a predetermined value. Signals from the first fluidic element are utilized for large flow rates, and signals from the second fluidic element for small flow rates.

According to another aspect of our invention in a flow meter of the non-moving part type comprising first and second flow measuring means having different operating point characteristics and which are connected together in series, a third flow measuring means which is larger than either of the first and second measuring means, and which is connected in series with the first and second flow measuring means upstream or downstream therefrom, and a valve controlled passage connected between upstream and downstream ends of the first and second flow measuring means to by-pass the first and second flow measuring means at a given rate of flow, flow rates up to the given rate are calculated by a comparison between the characteristics of the first and second measuring means but flow rates above the given rate are measured by the third measuring means.

The lowest flow rates are evaluated uniquely for any fluid by the use of the two small measuring means.

The two small measuring means create a pressure drop which increases with flow rate. Above a flow rate Q' the two measuring means will create an unacceptably high pressure loss across the device. They are therefore by-passed by the valve which begins to open at the given pressure drop. Specifically the valve is adapted to open only above the flow rate at which the third and largest measuring means has commenced operation.

The flow meter is designed such that when the third and largest measuring means commences operation it will measure the total flow rate from the by-pass and the two small measuring means. Flow rates above $Q'$ are therefore measured by the third measuring means.

However, when used alone, the third measuring means may suffer the problem described above. Namely the third measuring means may not be able uniquely to measure flow rate since only frequency (f) is measured, and:

$$f = \frac{Q}{K_3} \text{func}_3 \left( \frac{Q_3 C_3}{\nu} \right) \qquad 7$$

where Q and $\nu$ are unknown.

However in our construction there is flow through the two smaller meters even when the by-pass passage is operational. Therefore it is possible to evaluate $\nu$ from the two smaller measuring means as described above, and use it in equation 7 with a measured value of (f) to evaluate Q in the third measuring means.

Figure 2:
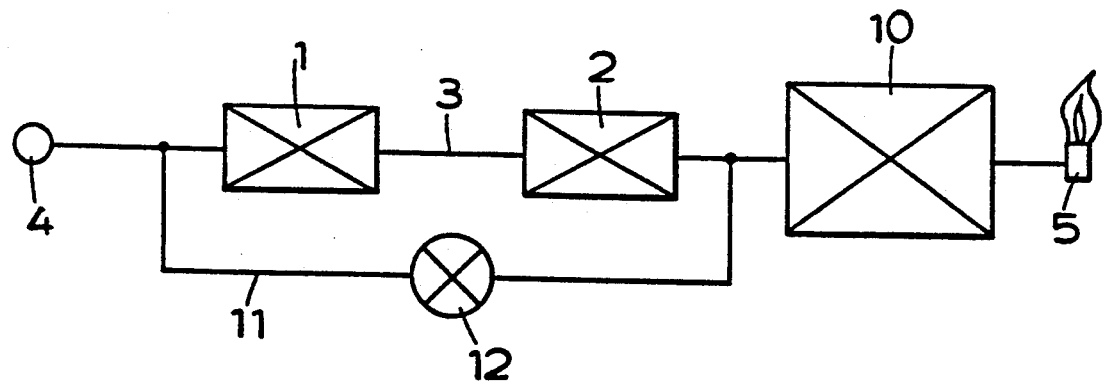

Two embodiments of our invention are illustrated in the accompanying drawings in which FIG. 1 is a schematic layout of one flow meter of the non-moving part type; and FIG. 2 is a schematic layout of another flow meter of the non-moving part type.

The flow meter illustrated in FIG. 1 of the drawings comprises first and second fluidic oscillating elements 1,2 which are connected in series in a pipe 3 for supplying a fluid, for example gas from a supply 4 to a a gas fired appliance 5.

Alternatively the fluid may comprise water flowing from a mains supply to a domestic appliance, suitably a boiler, washing machine, tap or faucet or the like.

The two elements 1,2 which, are of known construction, exhibit different operating point characteristics.

The flow rate Q in the pipe 3 can be evaluated by solving the two equations, namely:

$$f_1 = \frac{Q}{K_1} \text{func}_1 \left( \frac{C_1 Q}{\nu} \right) \text{for the element 1}$$

$$f_2 = \frac{Q}{K_2} \text{func}_2 \left( \frac{C_2 Q}{\nu} \right) \text{for the element 2}$$

In the flow meter illustrated in FIG. 2 of the drawings, a third fluidic oscillating element 10, which is larger than either of the elements 1,2, is connected in series in the pipe 3 between the element 2 of the appliance 5. A by-pass passage 11 incorporating a control valve 12 is connected between the supply 4 and the section of pipe between the elements 2 and 10.

In operation, flow rates up to a given value Q are measured, as before, by evaluating the values from the two equations referred to above, and the by-pass passage 11 is closed by the valve 12.

Flow rates above the give value Q, namely Q', are measured by the fluidic element 10 itself. This is achieved by the opening of the valve 12 at the given value Q of the flow rate.

In a modification the third fluidic element 10 may be located in the pipe 3 in a position between the supply 4 and the connection between the by-passage passage 11 and the pipe 3.

As in the embodiment of FIG. 1, the fluid being measured may be water instead of gas.

In modifications of the two flow meters described above, the fluidic oscillating elements are replaced by vortex shedders, by edge-tone oscillators, or by any combination of the three.

We claim:

1. A flow meter comprising:
   first and second flow measuring means having different frequency versus flow rate characteristics and which are connected together in series;
   a third flow measuring means having another frequency versus flow rate characteristics which is larger than either the first and second flow measuring means, and which is connected in series with the first and second flow measuring means upstream or downstream therefrom;
   a valve; and
   a by-pass passage controlled by said valve connected between upstream and downstream ends of the first and second flow measuring means to by-pass the first and second flow measuring means at a given rate of flow, including means for calculating flow rates up to said given rate comprising a comparison between the characteristics of the first and second flow measuring means, wherein said third flow measuring means is adapted to measure flow rates above the said given rate.

2. The flow meter according to claim 1, characterised in that the two smaller measuring means create a pressure drop which increases with flow rate, and the valve is adapted to open at a given pressure drop corresponding to the said given rate of flow.

3. A flow meter according to claim 1, characterised in that the valve is adapted to open only above the flow rate at which the third and largest measuring means has commenced operation.

4. A flow meter according to claim 1, characterised in that when the by-pass passage is operational there is a flow through the two smaller measuring means.

5. A flow meter according to claim 4, characterised in that the flow rate (Q) and the kinematic viscosity ($\nu$) are the same in both of the smaller measuring means whereby:

$$f_1 = \frac{Q}{K_1} \text{func}_1 \left( \frac{C_1 Q}{\nu} \right) \text{for the first flow means} \qquad (1)$$

$$f_2 = \frac{Q}{K_2} \text{func}_2 \left( \frac{C_2 Q}{\nu} \right) \text{for the second flow means} \qquad (2)$$

but since only the frequency (f) is capable of being measured by the third larger measuring means and $$f = \frac{Q}{K_3} \text{func}_3 \left( \frac{Q_3 C_3}{\nu} \right) \qquad 3$$

where Q and $\nu$ are unknown by evaluating ($\nu$) from equations 1 and 2, with a measured value of (f) the value (Q) can be evaluated for the third measuring means.

* * * * *